March 5, 1957 W. E. GREENAWALT 2,784,079
PROCESSES OF SMELTING FINELY DIVIDED IRON ORE
Filed Aug. 31, 1954
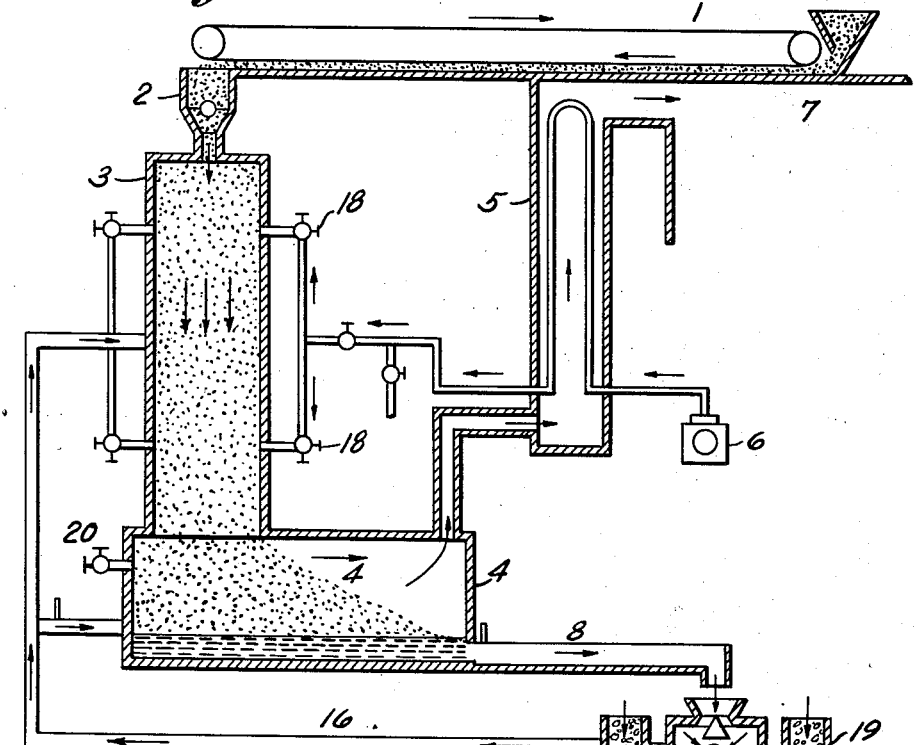
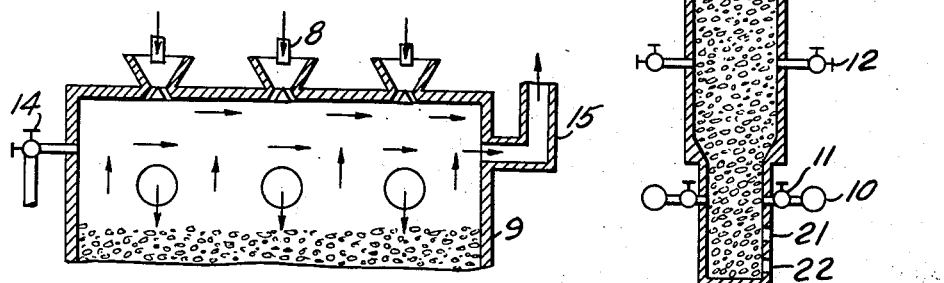
INVENTOR
William E. Greenawalt

2,784,079

PROCESSES OF SMELTING FINELY DIVIDED IRON ORE

William E. Greenawalt, Denver, Colo.

Application August 31, 1954, Serial No. 453,185

8 Claims. (Cl. 75—40)

My invention relates to smelting finely divided iron ore, such as concentrate obtained from ores too lean to be profitably smelted direct. The cencentrate, usually obtained by magnetic separation or flotation of the finely ground ore, is ordinarily prepared for blast furnace smelting by sintering, which converts it into semi-fluid lumps. This is done by mixing the fine ore with about ten percent water and several percent coke, igniting the charge and passing a blast of air through the porous mixture. The ore, in sintering, is heated to about 2100 deg. F., after which it is cooled; and when the cold ore is charged into the blast furnace it has to be heated again through the sintering temperature of 2100 deg. F. to the smelting temperature of 2800 to 300 deg. F. The process is expensive to install and to operate.

Much of the iron ore now smelted in the United States is being imported from various parts of the world, and increasingly, as the domestic high grade ore reserves are dwindling.

It would seem advantageous if the finely divided concentrate could be smelted as cheap or cheaper than smelting lumps, the exploitation of the enormous deposits of low grade domestic ore might favorably compete with foreign imports of high grade ore.

The object of the invention is to provide a simple practical process for the smelting of finely divided iron ore, such as magnetic or flotation concentrate, direct into pig iron.

In the accompanying drawing, Fig. 1 represents the process in vertical section, and Fig. 2 a longitudinal section through the upper part of the smelting furnace in Fig. 1.

In carrying out the process as in practice, the ore is dried or heated in the drier 1 and delivered into the hopper 2 from which it is fed in a continuous regulated stream into the highly heated atmosphere of the melting furnace 3 to melt it, and drops as a shower into a pool of the molten ore in the gas separating chamber 4, where the gas, at a temperature of about 2300 deg. F. is separated from the molten ore, then passes through the heat exchanger 5 to heat fresh air forced through it by the blower 6, and then flows into the dust chamber 7, to settle the dust and impart heat to the drier.

Part of the preheated air, at a temperature of 800 to 1000 deg. F., is used to burn the fuel in the melting furnace 3, which may be fuel oil, natural gas, or powdered coal, all of which are cheaper and more convenient for melting the ore than the high quality coke used in blast furnace smelting. Another part of the preheated air is used in the smelting furnace 9 to burn the carbon, usually in the form of coke, to furnish heat for the metallurgical reactions.

The molten ore, separated from the melting furnace gas, is flowed through the launder 8 in a substantially continuous regulated stream from the gas separating chamber 4 into the smelting furnace 9, which operates somewhat similar to an ordinary blast furnace, except that the furnace is charged with coke, and the ore is separately charged into it in a molten condition instead of in solid form.

The smelting furnace coke is crushed to a size to make close contact between it and the molten ore, and to permit the free flow of gas through it. Its temperature is maintained at the point of highest efficiency, 2800 to 3000 deg. F. or over, much the same as in ordinary iron blast furnace smelting, to promote the chemical reactions between the coke and the molten ore.

The rate of reduction is much faster in the liquid than in the soild form, because fresh surfaces are continuously and rapidly exposed to the full action of the highly heated coke as the molten ore percolates downwardly in contact with it against a continuously ascending current of highly heated reducing gas to produce pig iron and molten slag, and both are in close contact with the highly heated coke on the smelting furnace hearth.

The reactions for the production of crude iron from its oxidized ore may be summarized:

$$2C+Fe_2O_3=2Fe+3CO$$
$$3CO+Fe_2O_3=2Fe+3CO_2$$
$$CO_2+C=2CO$$

These chemical reactions do not require atmospheric air, but they absorb heat, and this heat has to be supplied to promote the reactions and prevent the molten ore from freezing. This is done, as in regular blast furnace smelting by injecting preheated air from the heat exchanger 5 into the smelting furnace 9 through the bustle pipe 10 and tuyeres 11. Other tuyeres 12 and 13 may be located where necessary to maintain the upper part of the coke column at a temperature above the chilling point of the molten ore, or at about 2300 deg. F. In addition it is desirable to inject a combustible, such as fuel oil, natural gas, or powdered coal, into the top end of the smelting furnace, above the coke, through the burner 14, Fig. 2.

The burner gas is removed, with the reacting gas from the coke, through the flue 15 at the opposite side of the smelting furnace. The waste gas from the smelting furnace, usually containing carbon monoxide, at a temperature of about 2300 deg. F., is delivered through the flue 16 into the melting furnace 3 or into the gas separating chamber 4, or both, and passes out of the separating chamber through the flue 17 into the heat exchanger 5 and then into the dust chamber 7.

Heating the ore in the melting furnace 3 with the hot gas from the smelting furnace 9, is supplemented with fuel burners 18, spaced as desired, and supplied with fresh hot air from the heat exchanger. Similarly, a fuel burner 20 may be used in the gas separating chamber 4.

The coke is forced from the hoppers 19 into the top of the smelting furnace 9 in a slow moving substantially continuous stream to give the exposed coke at the top of the furnace time enough to be heated sufficiently to avoid a chilling effect of the molten ore.

The burners 18 in the smelting furnace are arranged to inject air in regulable amounts to control the oxidizing or reducing atmosphere in the upper part of the column of the coke in the smelting furnace.

The molten ore from the gas separating chamber 4 is delivered in subdivided streams, through the launders 7, into the smelting furnace 9 to distribute its flow within the column of coke, as shown in Fig. 2. The distribution of the molten ore is also promoted by the action of the ascending smelting furnace gas.

The slag is withdrawn from the smelting furnace 9 through the taphole 21, and the molten iron through the taphole 22.

Flux may be added to the ore when and where desired, usually at the drier: and the column of coke in the smelting furnace may be wholly or partly heated by other means than with a blast of air.

I claim:

1. A process of smelting finely divided iron oxide ore concentrate obtained from milling low grade iron ore comprising, showering the ore through the highly heated atmosphere of a melting furnace to melt it, withdrawing the mixture of molten ore, molten slag, and melting furnace gas in a combined continuous stream from the melting furnace and delivering it into an enclosed chamber, separating the melting furnace gas from the mixture of molten ore and slag in the gas separating chamber, then flowing mixture of molten ore and slag, freed from the melting furnace gas, from the gas separating chamber through a highly heated column of carbon in a smelting furnace to complete the conversion of iron oxide into metallic iron and slag off impurities, and separating the molten metallic iron from the molten slag.

2. A process of smelting finely divided iron oxide ore comprising, showering the ore through the highly heated atmosphere of a melting furnace to melt it, withdrawing the mixture of molten ore and melting furnace gas from the melting furnace, separating the molten ore from the melting furnace gas, then flowing the molten ore, separated from the melting furnace gas, through a highly heated mass of carbonaceous reducing agent in a smelting furnace to complete the conversion of the iron oxide into metallic iron and slag impurities, and separating the molten iron from the molten slag.

3. A process of smelting finely divided iron oxide ore concentrate comprising, showering the ore through the highly heated atmosphere of a melting furnace to melt it, withdrawing the mixture of molten ore, molten slag, and melting furnace gas in a combined continuous stream from the melting furnace and delivering it into an enclosed chamber, separating the melting furnace gas from the mixture of molten ore and slag in the separating chamber, then flowing the mixture of molten ore and slag, freed from the melting furnace gas, into a smelting furnace in the presence of a highly heated reducing agent to complete the conversion of the iron in the oxide into metallic iron and slag impurities, and separating the molten metallic iron from the molten slag.

4. A process of smelting finely divided iron oxide ore comprising, showering the ore through the highly heated atmosphere of a melting furnace to melt it, withdrawing the mixture of molten ore, molten slag, and melting furnace gas from the melting furnace and delivering it into an enclosed chamber containing a pool of the molten ore and slag, withdrawing the hot waste melting furnace gas from over the molten pool, then flowing the mixture of molten ore and slag, freed from the melting furnace gas, through a highly heated mass of carbonaceous reducing agent in a separate smelting furnace to complete the conversion of the iron oxide into metallic iron and slag impurities, and separating the molten iron from the molten slag.

5. A process of smelting finely divided iron oxide ore comprising, showering the ore through the highly heated atmosphere of a melting furnace to melt it, flowing the mixture of molten ore, molten slag, and melting furnace gas from the melting furnace into an enclosed gas separating chamber, separately withdrawing the melting furnace gas from the gas separating chamber, separately withdrawing the mixture of molten ore and slag from the gas separating chamber, then flowing the mixture of molten ore and slag, separated from the melting furnace gas, into a smelting furnace in the presence of highly heated carbonaceous reducing agent to convert the iron of the oxide to metallic iron and slag impurities, and continuing the smelting to separate the molten iron from the molten slag.

6. A process of smelting finely divided iron oxide ore comprising, showering the ore through the highly heated atmosphere of a melting furnace to melt it, withdrawing the mixture of molten ore and melting furnace gas from the melting furnace, separating the resulting hot melting furnace gas from the molten ore, then flowing the molten ore separated from the melting furnace gas through a highly heated column of carbon in a smelting furnace, feeding carbon in a slow substantially continuous stream into the upper part of the smelting furnace to maintain the upper portion of the carbon column at a temperature above the melting point of the molten ore, continuing the smelting to convert the iron of the oxide into metallic iron and slag impurities, and separating the molten iron from the molten slag.

7. A process of smelting finely divided iron oxide ore comprising, showering the ore through the highly heated atmosphere of a melting furnace to melt it, withdrawing the mixture of molten ore and melting furnace gas from the melting furnace, flowing the withdrawn mixture into an enclosed chamber to separate the melting furnace gas from the molten ore, then flowing the molten ore separated from the melting furnace gas through a highly heated column of carbon in a smelting furnace to complete the conversion of the iron oxide into metallic iron and slag impurities, separating the molten iron from the molten slag, and flowing the hot gas issuing from the smelting furnace into the melting furnace and from the melting furnace into the gas separating chamber.

8. A process of smelting finely divided iron oxide ore comprising, showering the ore through the highly heated atmosphere of a melting furnace to melt it, withdrawing the mixture of molten ore and melting furnace gas from the melting furnace, flowing the withdrawn mixture into an enclosed chamber to separate them, separately withdrawing the melting furnace gas from the gas separating chamber, separately withdrawing the molten ore from the gas separating chamber, then flowing the molten ore separated from the melting furnace gas, through a highly heated column of carbon in a smelting furnace to complete the conversion of the iron in the oxide into metallic iron and slag impurtities, separating the molten iron from the molten slag, and flowing the hot gas issuing from the smelting furnace into the gas separating chamber.

References Cited in the file of this patent

UNITED STATES PATENTS

| Number | Name | Date |
|---|---|---|
| 57,969 | Reese | Sept. 11, 1866 |
| 859,572 | McDonald | July 9, 1907 |
| 2,307,459 | Greenawalt | Jan. 5, 1943 |
| 2,581,597 | Nissim | Jan. 8, 1952 |